March 28, 1961     J. B. BECKWITH     2,977,109
FLUID COOLED SPRING DEVICE
Filed May 11, 1955

INVENTOR
JOHN B. BECKWITH

BY *Scrivener & Parker*

ATTORNEYS

United States Patent Office 2,977,109
Patented Mar. 28, 1961

2,977,109

FLUID COOLED SPRING DEVICE

John B. Beckwith, Bristol, Conn., assignor to Associated Spring Corporation, Bristol, Conn., a corporation of Delaware Filed May 11, 1955, Ser. No. 507,647

1 Claim. (Cl. 267—1)

This invention relates to springs and spring devices which are adapted and intended to be subjected to high ambient temperature in use.

The development of new power plants such as gas turbines and nuclear engines which produce, or operate at, very high temperatures has made it necessary to provide springs having useful properties at these high temperatures, which may be above 1000° F. While efforts have been made to solve the problem by improved alloys and metallurgical procedures, there is no known material from which springs may be made which will retain their required characteristics at the very high temperatures now encountered. Springs made of straight carbon steel begin to lose their spring properties at about 200° F. while even springs made of the best high temperature spring materials, such as Inconel–X, will set appreciably at temperatures above 1000° F.

It has accordingly been the principal object of this invention to provide a spring of new and improved construction, and a new and improved spring device or system, which will permit springs made of known and available materials to be used in locations subjected to very high temperatures without change in their spring characteristics.

Figure 1:
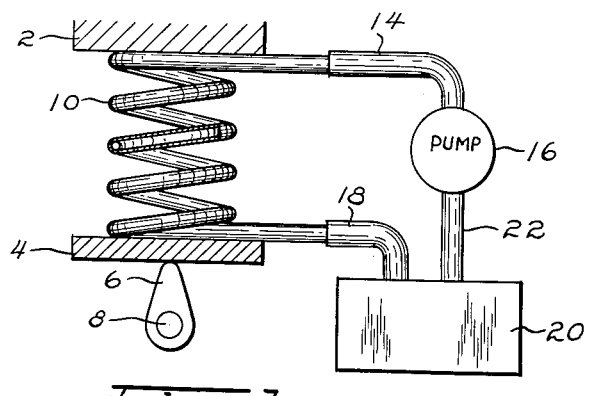
Figure 2:
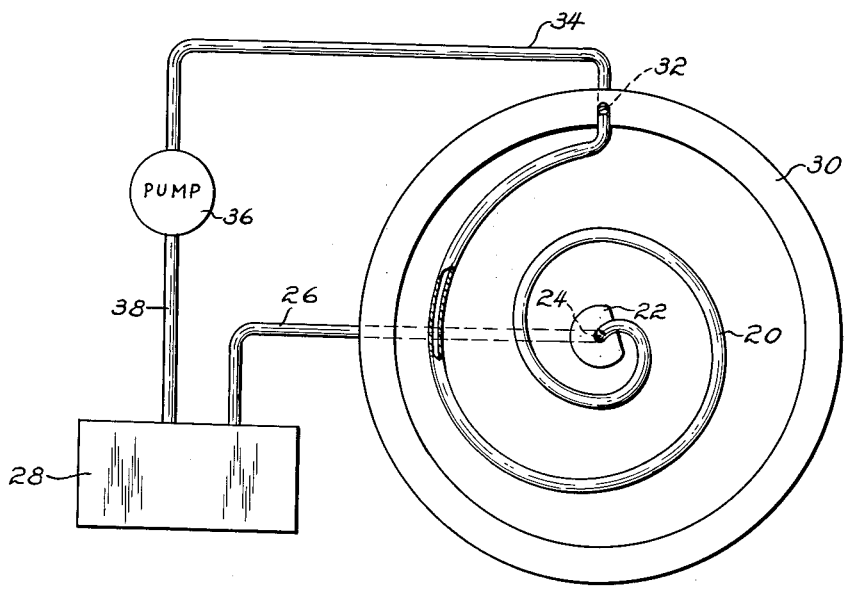

Embodiments of the invention, which are illustrative of the many forms which it may take, are described in the following specification and illustrated in the accompanying drawing, in which Fig. 1 is a side view, partly in section and partly in elevation, showing a machine device including a helical compression spring formed in accordance with the invention, and Fig. 2 is an elevational view showing another machine device having a torsion spring associated therewith which is constructed in accordance with the invention.

In Fig. 1 of the drawings there is shown a machine device having a spring as a part thereof and which is subjected to high ambient temperature. This machine device comprises a fixed base 2 and a movable head 4 which is mounted for reciprocating movement with respect to the base 2 and is given such reciprocating movement by a cam 6 which bears on the lower surface of the head 4 and which is rotated by any suitable means such as camshaft 8. A helical compression spring 10 is disposed between the base 2 and head 4 and bears at its ends on these two relatively movable parts.

In accordance with the invention the spring 10 is formed of hollow tubing, and one end of the spring is connected by a hollow tubular part 14 to the delivery side of a pump 16 while the other end of the spring is connected by a hollow tubular part 18 to a reservoir 20 of cooling fluid, which may be a liquid or a gas, and which may have cooling means associated therewith. This reservoir is connected to the intake side of the pump by a hollow tubular connection 22.

In Fig. 2 of the drawings the invention is disclosed as applied to a torsion spring 20 which is formed of hollow tubular material. The inner end of the spring is connected to a shaft or arbor 22 and communicates with a passage 24 in the shaft which itself communicates through tubing 26 with a reservoir 28 of cooling liquid or gas. The outer end of the spring is connected to a drum 30 which is rotatable relatively to shaft 22 and which has within it a passage 32 which itself communicates through tubing 34 with the delivery side of a pump 36, the intake side of which communicates through tubing 38 with the reservoir 28.

In the utilization of the invention a hollow tubular spring, as provided by the invention, is disposed in any mechanism and in any location subject to high ambient temperature and is connected in any suitable way, such as those disclosed in Figs. 1 and 2, to cause a cooling liquid or gas to be continuously passed through it while in operation or before or after operation, thus cooling the spring.

In a typical example of the use and operation of the invention a helical compression spring is wound from a length of high carbon steel tubing and is then hardened and tempered and cold set. This spring is then connected to a pump and reservoir system, as described hereinbefore, which, when the spring is subjected to high ambient temperature, causes water or air, or any other suitable cooling liquid or gas to be circulated through the spring to cool it.

While the specific springs illustrated in the drawings and described in this specification are a helical compression spring and a torsion spring of circular cross-section, it will be apparent to those skilled in the art that the invention is fully and equally applicable to springs of other types and of any desired cross-sectional shape and that springs of any and all types may be formed of hollow tubing and cooled in the manner disclosed herein, all within the scope and spirit of the invention, for the limits of which reference must be made to the appended claim.

What is claimed is:

A spring device comprising a spring formed of a hollow rod of heat conducting material and having a passage through the material having open ends, a source of cooling medium, and means for passing cooling medium from said source through said passage while the spring is in use, thereby to permit the operation of the spring in an elevated ambient temperature at which the material of which the spring is formed would lose its spring properties.

References Cited in the file of this patent

UNITED STATES PATENTS

| 2,039,759 | Webb | May 5, 1936 |
| 2,113,311 | Rode | Apr. 5, 1938 |
| 2,715,023 | Nallinger | Aug. 9, 1955 |

FOREIGN PATENTS

| 569,919 | Great Britain | June 14, 1945 |
| 1,065,808 | France | Jan. 13, 1954 |